May 20, 1952　　　J. H. BREAZEALE, JR　　　2,597,563
AIRPLANE WITH DETACHABLE FUSELAGE
Filed Dec. 3, 1945　　　　　　　　　　　　3 Sheets-Sheet 1

INVENTOR
JAMES H. BREAZEALE, JR
BY Rodney Bedell
ATTORNEY

INVENTOR
JAMES H. BREAZEALE, JR.

By Rodney Bedell
ATTORNEY

May 20, 1952  J. H. BREAZEALE, JR  2,597,563
AIRPLANE WITH DETACHABLE FUSELAGE
Filed Dec. 3, 1945  3 Sheets-Sheet 3

INVENTOR
JAMES H. BREAZEALE, JR.

By Rodney Bedell
ATTORNEY

Patented May 20, 1952

2,597,563

UNITED STATES PATENT OFFICE 2,597,563

AIRPLANE WITH DETACHABLE FUSELAGE

James H. Breazeale, Jr., St. Louis, Mo.

Application December 3, 1945, Serial No. 632,376

3 Claims. (Cl. 244—118)

The invention relates to airplanes with detachable fuselages and more particularly to airplanes used for transporting passengers and cargo.

One object of the invention is to provide an airplane with a fuselage capable of carrying large loads which may be readily attached to and detached from a flying unit carrying the motors and control surfaces and capable of flying with or without the fuselage.

Another object of the invention is to provide an airplane in which the fuselage can be readily removed from or attached to the flying unit by the pilot from his compartment without the use of cranes or other accessories.

Another object of the invention is to provide an airplane in which the aileron and rudder are operated by a single movement of a single control.

Another object of the invention is to provide a cargo carrying airplane which, when fully loaded, is highly responsive to the controls and which lands and takes off at low speed.

These and other detail objects of the invention as will appear below are attained by the structure shown in the accompanying drawings, which structure is intended to be illustrative and not exclusive of other arrangements embodying the general inventive principles.

Figure 3:
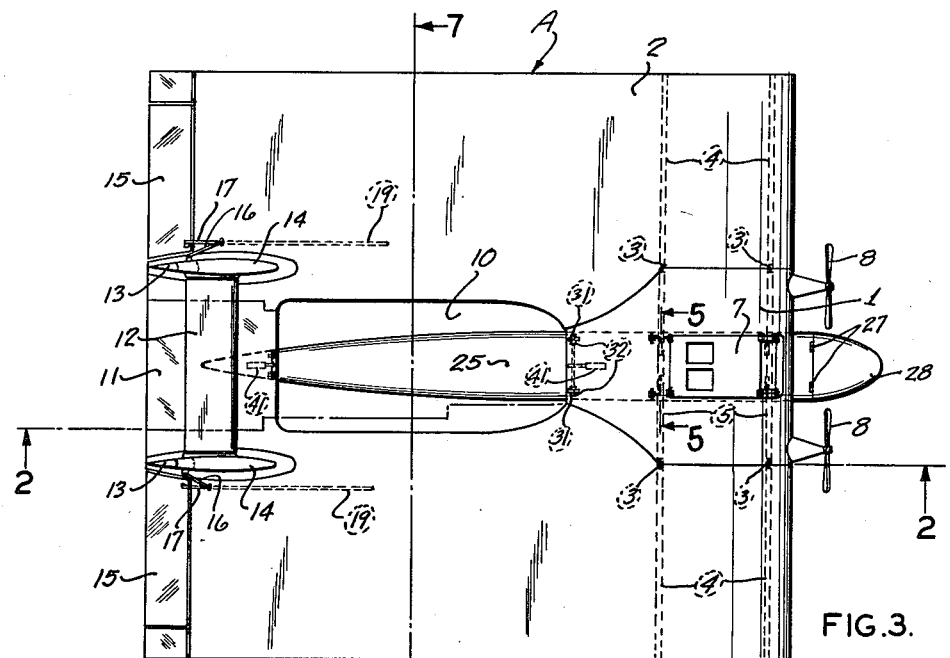
Figure 3 is a top view of the airplane.

The airplane comprises a flying unit A having a center section 1 with wings 2 extending laterally and longitudinally therefrom with the leading edges of the center unit and the wings being co-extensive. The wings also extend the full width and length of the plane and have a chord length approximately equal to the span of the flying unit. The wings also extend rearwardly beyond the trailing edge of the center section and the wing ratio of length to depth is preferably 9 to 1. The wings 2 may be attached at 3 to the center section 1 by bolts (not shown) through the ends of wing trusses 4 and center trusses 5 (see Figure 3).

At the center forward part of center section 1 is a pilot's compartment 7. Extending forwardly of center section 1 and supported thereby are propellers 8 driven by motors 9 housed within center section 1 at each side of the pilot's compartment 7. Wings 2 are cut away at 10 behind pilot's compartment 7 and are connected, at the rear of the plane, by a stabilizer 11 of the tail assembly. The tail assembly comprises also an elevator 12 and rudders 13 pivoted to fins 14 supported by wings 2. Elevator 12 is positioned above stabilizer 11 and in the direct path of the airstream passing through the cut away portion 10 of wings 2 to provide more positive control to the plane and to prevent galloping. Hinged to the trailing edge of wings 2 are ailerons 15. Rudders 13 and ailerons 15 are connected to each other by levers 16 and 17 and to a control wheel 18 in the pilot's compartment 7 by linkage 19 in wings 2 and center section 1 whereby, by rotating wheel 18, ailerons 15 and rudders 13 are operated simultaneously. Elevator 12 is operated by moving wheel 18 forwardly or rearwardly to lower or raise the elevator, in the usual manner, through linkage 20, bell crank 21, and lever 22 attached to elevator 12 (see Figure 2).

Figure 2:
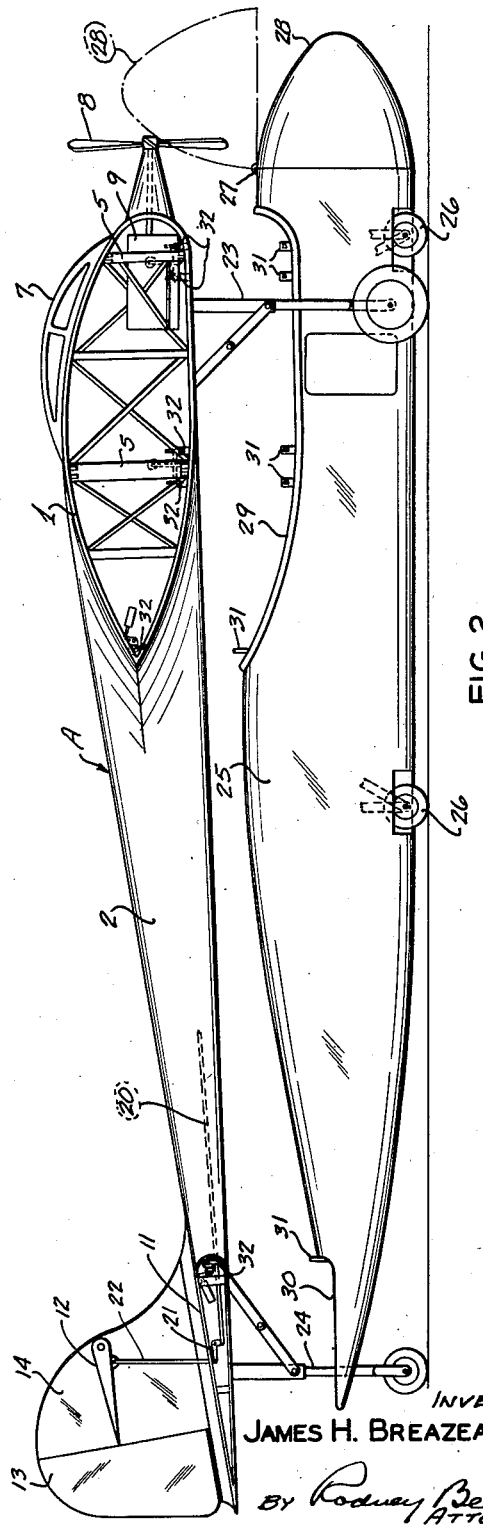
Figure 2 is a vertical section taken approximately on line 2—2 of Figure 3, but drawn to a larger scale, and shows the fuselage detached from the flying unit.
Figure 4:
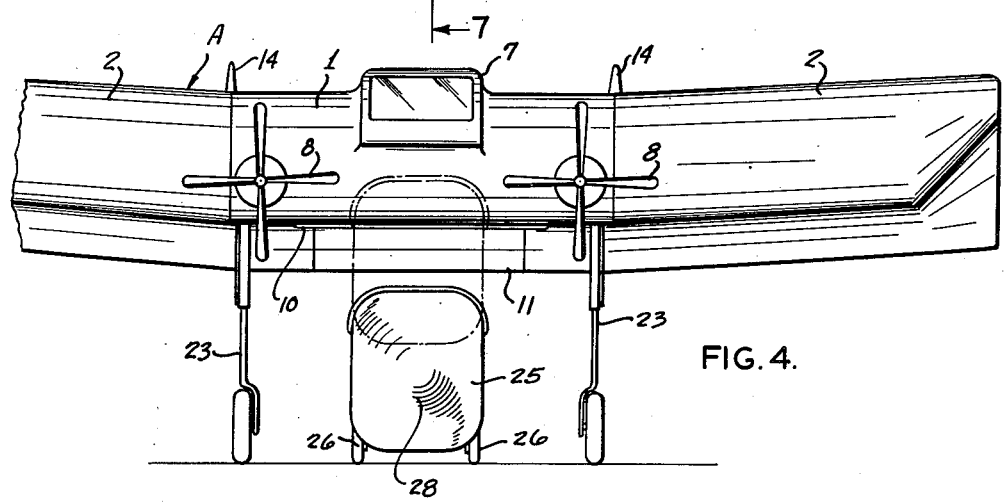
Figure 4 is a front view thereof showing in solid lines the fuselage detached from the flying unit, and in dotted lines the fuselage attached to the flying unit.
Figure 5:
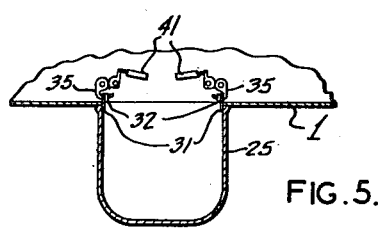
Figure 5 is a section taken approximately on line 5—5 of Figure 3, but drawn to a larger scale, showing the locking mechanism used to attach the fuselage to the flying unit.
Figure 6:
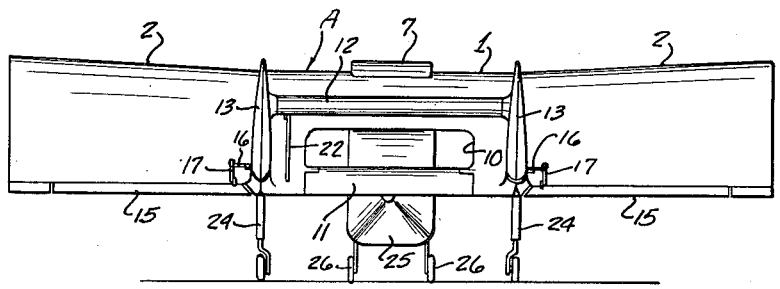
Figure 6 is a rear view of the airplane showing the fuselage in position for attachment to or detachment from the flying unit, similar to Figure 1.
Figure 7:
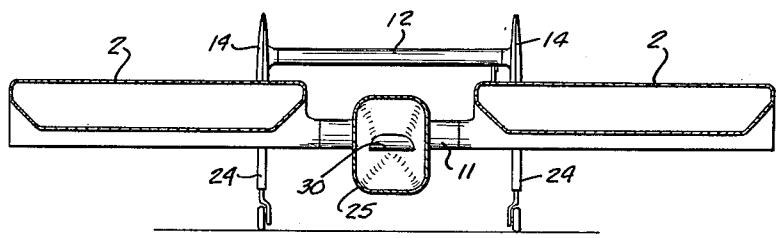
Figure 7 is a vertical section taken on line 7—7 of Figure 3.

Flying unit A has a retractable landing gear 23 and a retractable tail wheel 24 which may be extended (as shown in Figures 2 and 4) by compressed air or other means to raise flying unit A for the purpose described below.

Figure 1:
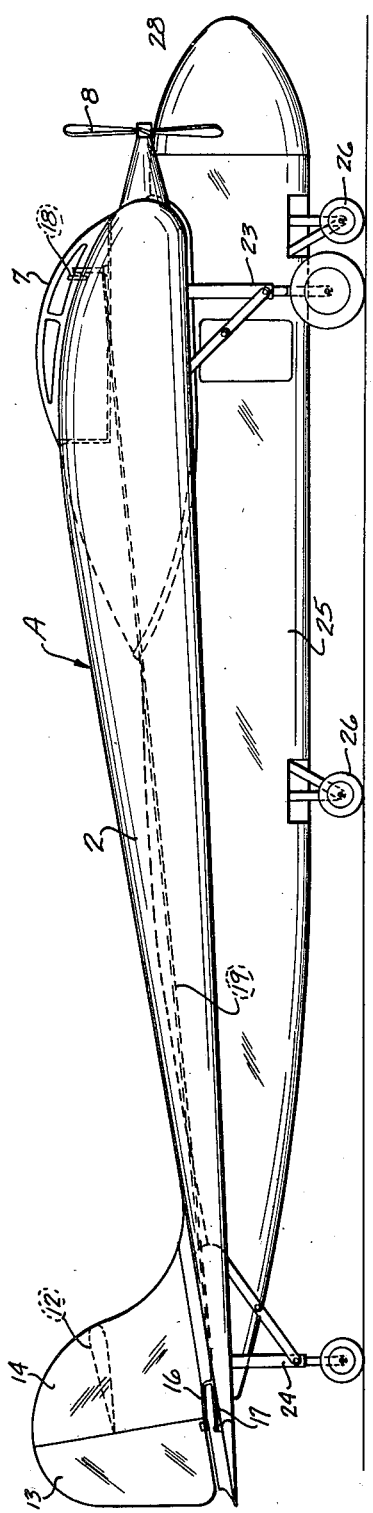
Figure 1 is a side view of an airplane constructed according to my invention and shows the fuselage in position for attachment to or detachment from the flying unit.

Attached removably to the lower portion of flying unit A is a fuselage 25 protruding forwardly beyond flying unit A and extending rearwardly substantially the entire length of the plane, as shown in Figures 1 and 2. However, wings 2 of flying unit A preferably extend rearwardly of fuselage 25. Fuselage 25 has retractable wheels 26 which may be extended also, as shown in Figure 1, by compressed air or other means to raise the fuselage to facilitate attachment of the fuselage to or removal of the fuselage from flying unit A. The forward end of the fuselage is hinged at 27 to provide a door 28 of substantial size to facilitate loading and unloading cargo.

Figure 8:
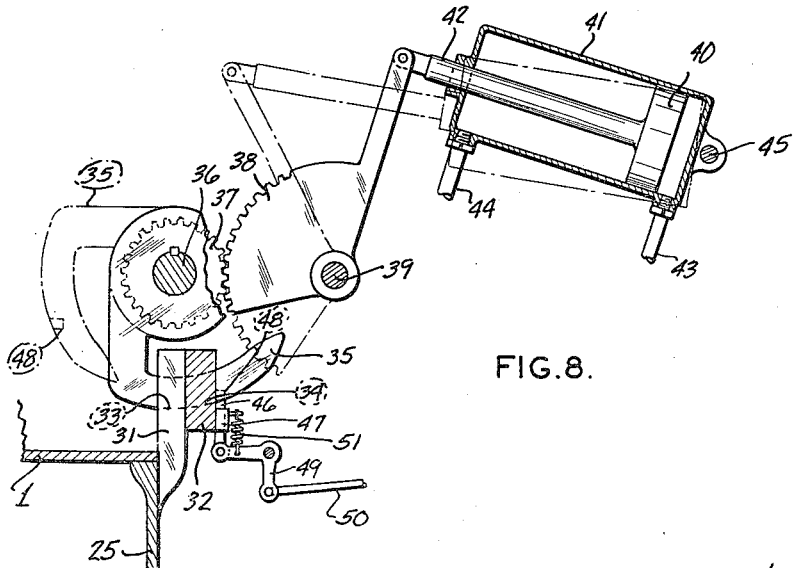
Figure 8 is an enlarged view showing in further detail the locking mechanism shown in Figure 5.

The overall contour of fuselage 25 is somewhat similar to the shape of a cigar, but the upper portion of the fuselage is cut away at 29 and 30 to fit the contour of flying unit A. Fuselage 25 has attached thereto a series of lugs 31 extending upwardly therefrom and positioned in cut out portions 29 and 30. Likewise, flying unit A has a series of lugs 32 attached thereto and aligned horizontally with lugs 31 of fuselage 25. Lugs 31 and 32 are slotted at 33 and 34, respectively, to receive a tongue 35 keyed to a shaft 36 and a gear 37. (See Figure 8.) Gear 37 meshes with a segment 38 pivoted on a shaft 39 and operated by a piston 40 in a cylinder 41 thru a connecting rod 42 when compressed air is introduced into cylinder 41 through port 43 or 44 at the ends of cylinder 41. Cylinder 41 is pivoted at 45 to accommodate movement of piston 40, gear segment 38, and associated parts from the position shown in solid lines in Figure 8 to the position shown in dotted lines. The control for supplying compressed air to cylinder 41 preferably is located in the pilot's compartment 7.

To lock tongues 35 against accidental withdrawal from slots 33 and 34 in lugs 31 and 32, latches 46 slidably supported in brackets 47 on lugs 32 engage tongues 35 at slots 48. Each latch 46 is operated by a bell crank 49 through linkage 50 to a central control in the pilot's compartment, and is urged yieldingly into engagement with associated tongue 35 by a tension spring 51 fastened at its ends to bracket 47 and bell crank 49.

To attach fuselage 25 to flying unit A, the flying unit is raised by landing gear 23 and tail wheel 24 to the position shown in Figures 2 and 4 to clear fuselage 25 as flying unit A and fuselage 25 are moved into position for attachment. Flying unit A may be taxied or moved by a tractor or other means into position over fuselage 25, or fuselage 25 may be moved under flying unit A. Fuselage 25 then is raised on retractable wheels 26 to its upper limit, and flying unit A is lowered until slots 33 and 34 in lugs 31 and 32 of fuselage 25 and flying unit A, respectively, are in registry, then tongues 35 are moved into engagement with lugs 31 and 32 by the pilot through the control in his compartment. Safety latches 46 are moved into position by the pilot to lock tongues 35 securely against accidental withdrawal from slots 33 and 34 in lugs 31 and 32. Wheels 26 of fuselage 25 are retracted and landing gear 23 and tail wheel 24 of flying unit A are telescoped to normal take-off position. To remove fuselage 25 from flying unit A, the procedure is reversed.

Flying unit A is independent of fuselage 25 and includes all motors, controls, and control surfaces so that flying unit A can fly with or without fuselage 25.

Fuselage 25 is readily attachable to or detachable from flying unit A, the operation requiring only a very short time, and a complete change of fuselages can be made by the pilot from his compartment.

By extending the wings rearwardly beyond the fuselage and forwardly substantially the entire length of the plane, the plane can take-off and land under full load at a speed of about 60 miles per hour. Also, the plane is highly responsive to the controls because all the control surfaces are located at the rear of the plane, and elevator 12 is positioned above stabilizer 11 in the direct path of the air stream flowing through cut away portion 10 of wings 2. In addition, the plane is easy to fly since only a single movement of the control is necessary to operate the ailerons and rudders.

While I have described the airplane for use in transporting freight, it should be understood that the airplane may be used to transport passengers also. In some instances it may be expedient to equip some fuselages with sleeping accommodations, and, after a night run, the fuselage can be replaced quickly with a fuselage having seats for daytime use.

The details of the construction may be varied substantially without departing from the spirit of the invention and the exclusive use of such modifications as come within the scope of the claims is contemplated.

What is claimed is:

1. In an airplane, a self-sustaining flying unit comprising a center section, a wing mounted on each side of the center section with their respective leading edges being co-extensive, propulsion means and a pilot's compartment in the center section, the wings having a chord length approximately equal to the span of the flying unit and extending rearwardly beyond the trailing edge of the center section, adjustable control surfaces on the trailing edges of the wings, extensible and retractable landing gear on the flying unit, a complete fuselage attachable to and detachable from the flying unit and having an extensible and retractable landing gear thereon, the landing gear of both the flying unit and the fuselage cooperating in the landing of the composite airplane, cooperating latch members on the upper side of the fuselage and on the lower side of the flying unit, a locking means on the flying unit operatively associated with the cooperating latch members to effectively lock and hold the fuselage to the flying unit, the landing gear of the flying unit being extensible beyond the landing position to lift the flying unit from the fuselage so that when the cooperating members are released by the locking means the fuselage may be separated wholly from the flying unit and a new fuselage attached by the relative vertical movement between the flying unit and the fuselage.

2. In an airplane as defined in and by claim 1 wherein the cooperating latch members are lugs having slots therein which are aligned when the flying unit and fuselage are joined and the locking means comprises a tongue which passes through the aligned slots and a latch pin engaging the tongue to retain the tongue in locking position.

3. In an airplane having a flying unit with a pilot's compartment and a detachable fuselage, means to fasten said fuselage to said flying unit comprising lugs on said fuselage and on said flying unit with slots aligned with each other, a tongue to enter said slots to hold said lugs together and having an aperture, and a pin to pass through said aperture after insertion of said tongue through said slots to prevent accidental removal of said tongue from said lugs.

JAMES H. BREAZEALE, Jr.

REFERENCES CITED

The following references are of record in the file of this patent:

UNITED STATES PATENTS

| Number | Name | Date |
|---|---|---|
| 1,336,405 | Kleckler | Apr. 6, 1920 |
| 1,401,934 | Zahm | Dec. 27, 1921 |
| 1,465,973 | Curtiss | Aug. 28, 1923 |
| 1,759,164 | Lyons | May 20, 1930 |
| 1,795,990 | Adkins | Mar. 10, 1931 |
| 1,797,713 | Brogelli | Mar. 24, 1931 |
| 1,848,578 | Scraggs | Mar. 8, 1932 |
| 1,860,076 | Callison | May 24, 1932 |
| 1,862,102 | Stout | June 7, 1932 |
| 1,992,941 | Fowler | Mar. 5, 1935 |
| 2,075,042 | Knerr | Mar. 30, 1937 |
| 2,106,289 | Wallace | Jan. 25, 1938 |
| 2,110,516 | Weick | Mar. 8, 1938 |
| 2,387,527 | Nagamatsu | Oct. 23, 1945 |
| 2,448,862 | Conklin | Sept. 7, 1948 |

FOREIGN PATENTS

| Number | Country | Date |
|---|---|---|
| 559,819 | Great Britain | Mar. 7, 1944 |